Feb. 8, 1949. E. W. MAYNARD ET AL 2,461,290
BOTTLE CHUTE
Filed Oct. 13, 1945 2 Sheets-Sheet 1
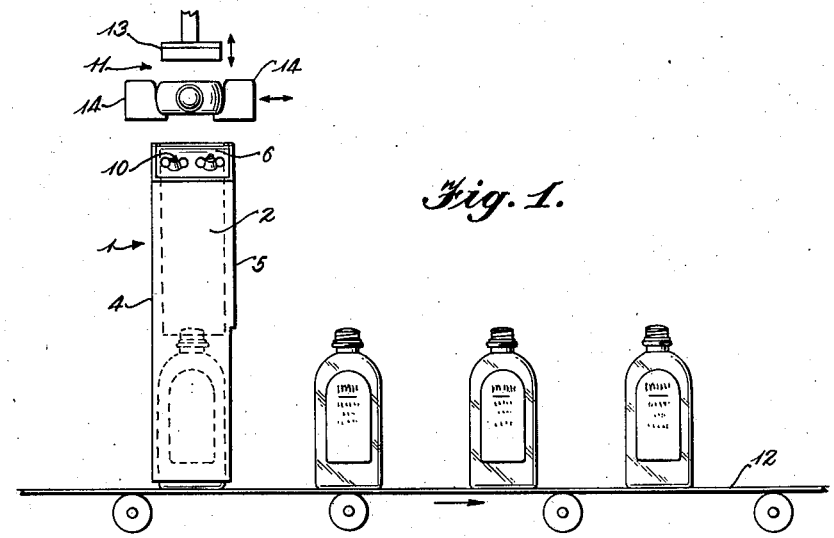
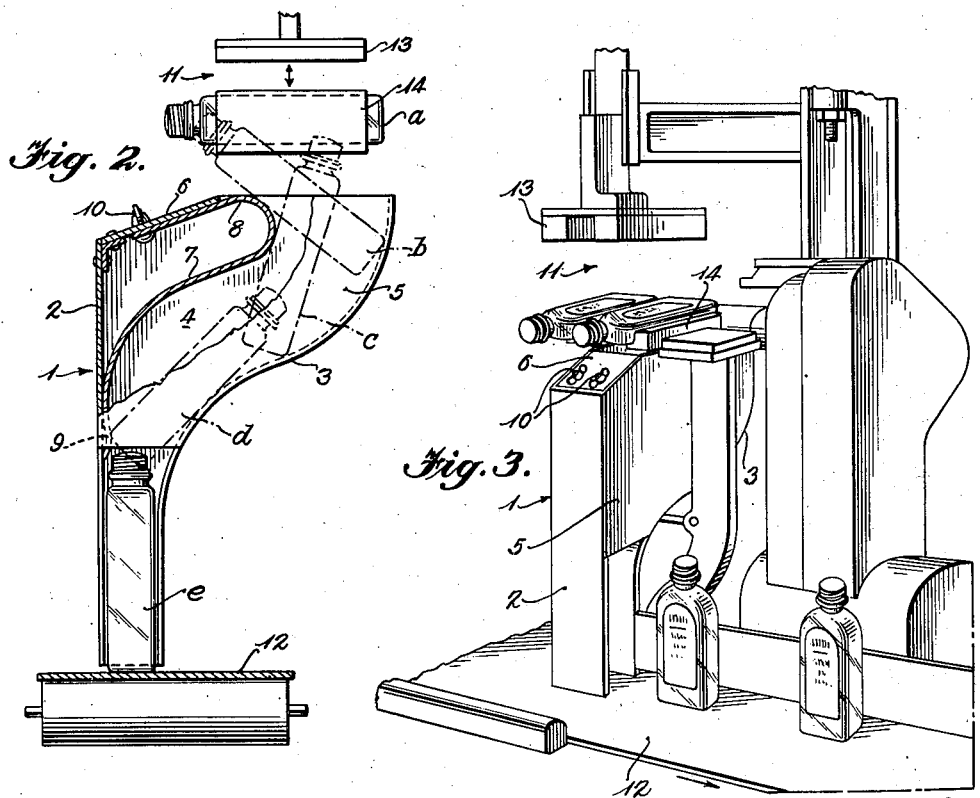
INVENTORS
Ernest W. Maynard and
Louis P. Di Giacomo
BY
ATTORNEY Feb. 8, 1949.  E. W. MAYNARD ET AL  2,461,290
BOTTLE CHUTE
Filed Oct. 13, 1945  2 Sheets-Sheet 2
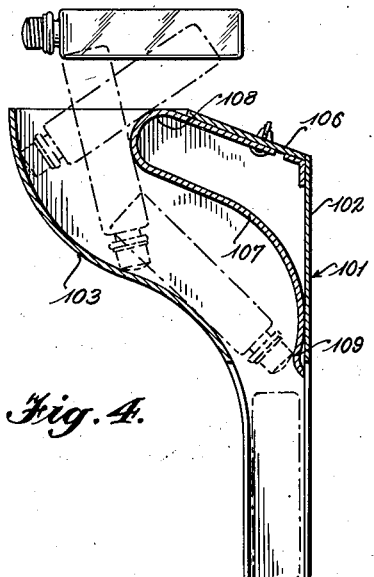
Fig. 4.
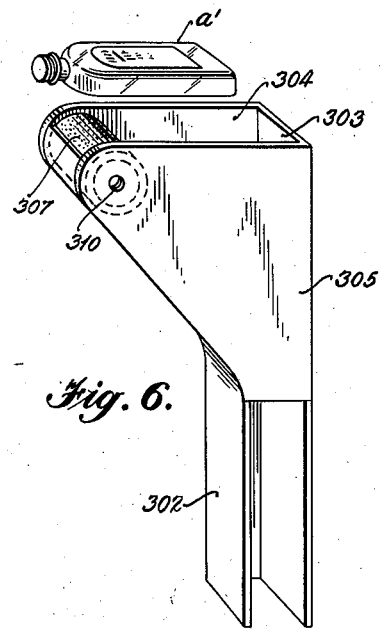
Fig. 6.
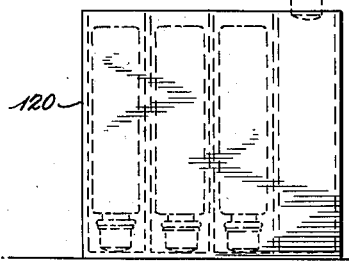
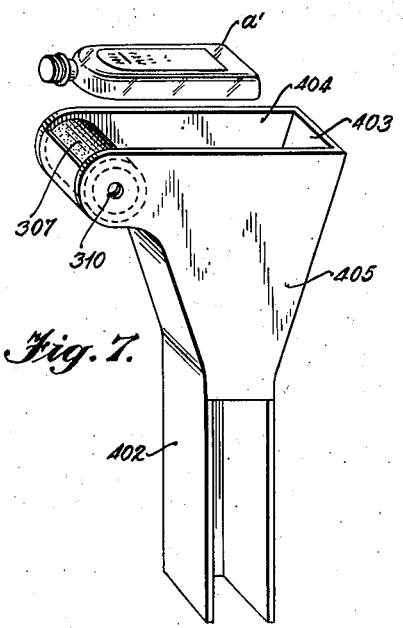
Fig. 7.
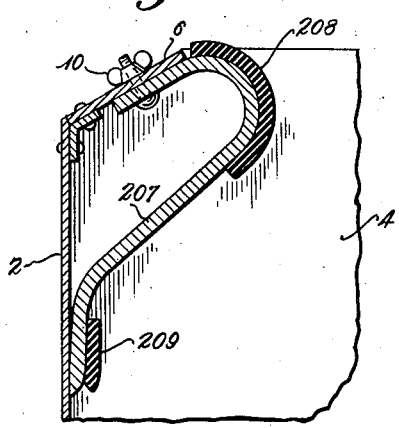
Fig. 5.
INVENTORS
Ernest W. Maynard and
BY Louis P. Di Giacomo
ATTORNEY Patented Feb. 8, 1949

2,461,290

UNITED STATES PATENT OFFICE 2,461,290

BOTTLE CHUTE

Ernest W. Maynard, Brooklyn, N. Y., and Louis P. Di Giacomo, Jersey City, N. J., assignors to American Home Products Corporation, New York, N. Y., a corporation of Delaware Application October 13, 1945, Serial No. 622,204

5 Claims. (Cl. 198—33)

This invention relates to a chute for use in conjunction with automatic bottle-handling machinery to receive bottles freely falling in a substantially horizontal position from one operating step and by means of gravity alone to deliver them to the next operating step in a substantially vertical position and in desired orientation and alinement, the chute having associated with it resilient checking means for obverting the bottles. More particularly it relates to such a chute adapted to receive horizontal free-falling bottles and deliver them to a conveyor belt for transportation to a succeeding processing step in a desired vertical position—for example, to deliver the bottles to a conveyor belt in such position that they will be carried away from the chute standing upright on the belt with uniform orientation. Preferably the bottles are guided through the chute by surfaces of horizontal cylindrical curvature.

In one type of machine now in use a label is applied to a filled and capped bottle lying on its side while held between the jaws of a clamp or vise. After the label has been applied, the jaws are automatically opened, permitting the bottle to fall down a slide to a conveyor belt by which it is carried to the next operating station, e. g. the application of a cap collar.

In actual use this operation presented several disadvantages. In the first place, the bottles landed on the belt in various positions, mostly on their sides. Their helter-skelter arrangement made difficult their precise and rapid removal from the belt by the operator at the next station. In the second place, the delivery of the bottles to the belt in a more or less helter-skelter arrangement occasionally caused collisions between bottles unless the machine was run at a disadvantageously slow rate. Such collisions resulted in breakage and loss. Furthermore, the contents of broken bottles ran over the belt and soiled the labels of such following bottles as landed on their sides on the belt. In this way a comparatively low percentage of breakage would result in a considerable percentage of rejects due to dirty labels. The cumulative effect of these disadvantages was to slow up operations, increase rejects, increase maintenance cost and even require the attention of an additional machine operator.

Certain devices have been proposed to aline packages or the like in continuous automatic machines, but as far as we know they have involved additional power-driven moving parts, guides having twisted surfaces or other features which add both to the first cost and the maintenance expense, or they have not been suitable for use in handling bottles.

It is one object of our invention to provide a simple and inexpensive device for transferring bottles to a conveyor belt in uniform position and orientation.

It is another object of our invention to provide a device of this character which will receive and orient freely falling bottles substantially without breakage.

It is another object of our invention to provide a device of this character which will avoid soiling of labels.

It is a further object of our invention to provide a device of this character which will operate by gravity alone without the use of power-driven moving parts.

It is an additional object of our invention to provide a device of this character which is devoid of guides having twisted surfaces.

Further advantages will be apparent from the following description.

According to our invention we provide a chute positioned to receive freely falling bottles from a previous operating step, such as labeling, in which the bottles are treated in a uniformly oriented position. If the bottles are simply released to fall by gravity from this operation, our chute is placed directly below the operating device; if the bottles are ejected, as by a plunger, our chute is placed so that its top opening is in the trajectory of the falling bottles. In our chute we mount a checking means or bumper, such as a check plate, positioned to intercept and check the fall of one end of the bottle, ordinarily the neck end, as it enters the top of the chute. This bumper or check plate is made of a resilient material such as spring steel or rubber or rubber-covered metal, and is preferably so mounted as to be adjustable by bending or otherwise. The middle part of our chute is made with at least one curved or bent side which preferably functions to damp the movement of the falling bottle; it is advantageous also in many cases to provide a downwardly bent extension of the check plate to cooperate in the damping. The lower part of our chute is made with a cross section designed to conform to the cross section of the bottle with a loose fit so that the bottle can readily slide down through the chute. If the bottle is of oblong cross section the chute preferably has an oblong cross section so that all bottles are uniformly oriented as they leave the chute.

The effect of this construction is to up-end each bottle uniformly as it enters the chute so as to cause it to slide down through the chute in a vertical position. If, as is frequently the case, it is desired to deliver bottles of oblong cross section to a conveyor belt, we arrange the check plate to engage and retard the neck of the bottle so that the bottle descends through the chute bottom first and is carried away by the belt in an alined upright position, and we arrange the conforming cross section of the chute to cause the bottles to land on the belt uniformly oriented— e. g. with their broader sides parallel to the movement of the belt.

Our chute is so designed that no guide is required having a twisted surface.

Specific embodiments of our invention are illustrated diagrammatically in the accompanying drawings, but these are intended to be examples only and not to limit our invention.

In the drawings:

Fig. 1 represents a front view of one embodiment of our chute used in conjunction with a labeler and a conveyor belt;

Fig. 2 is a partially cut-away view of one form of our chute from the side;

Fig. 3 is a perspective view of an embodiment of our chute in use in a labeling machine;

Fig. 4 is a sectional view from the side of another embodiment of our chute;

Fig. 5 illustrates a modified form of check plate; and

Figs. 6 and 7 illustrate further modifications of our chute.

The chute illustrated in Figs. 1, 2 and 3 and generally indicated by 1, comprises a flat vertical face plate 2, a curved back plate 3, two plane side plates 4 and 5, an inclined flat top plate 6 and a spring-steel check plate 7, the upper portion of which, 8, serves to receive and check the impact of the falling bottles, and the tail portion of which, 9, serves to damp and guide their descent. Both the curved back-plate 3 and the curved check plate 7 are constructed without twisted surfaces, i. e. those portions of their surfaces which are not plane can be geometrically generated by two horizontal elements moving always parallel to their original positions and to each other. Side plate 5 extends only part way down the chute, as shown in Figs. 2 and 3, to permit egress of the bottles in a vertical position.

The front and back plates 2 and 3, side plates 4 and 5, and top plate 6 are riveted together in conventional manner with the aid of bent-over flanges and angle pieces. These plates are preferably made of sheet metal, but alternatively may be made of wood, plastic, vulcanized fiber, or like materials.

Check plate 7 is removably mounted under top plate 6 by means of two bolts and wing nuts 10. This plate is preferably made of sheet spring steel tempered to a point where it can be sufficiently bent in the cold to be worked into the desired form. Alternatively, for example, rubber-covered metal, suitably mounted blocks of rubber, or even a thin steam-bent wood splint may be used, and all similar resilient constructions are included in our use of the term "check plate."

In the embodiment illustrated in Figs. 1, 2 and 3, chute 1 is mounted in a fixed position by conventional supports (not shown) immediately under the labeler, generally indicated by 11, and immediately above conveyor belt 12.

Labeler 11 has automatically-operated rubber-faced plunger 13 for pressing down automatically applied gummed labels on the sides of the bottles, and jaws 14 which are shaped to form a bottle-retaining cup. After application of a label, one or both of these jaws are automatically moved outward, permitting bottle to fall into chute 1.

In the embodiment illustrated in Fig. 3, a double semi-automatic labeler is shown. The left-hand bottle is placed by hand in a bottle cup with fixed jaws and a label is automatically applied. As plunger 13 rises, operator removes bottle, reverses it, and places it in right-hand cup with releasing jaw; at the same time operator places another bottle in left-hand cup. In the right-hand cup a label is automatically applied to the unlabeled side of the first bottle. As plunger 13 rises again, bottle cup jaw releases the first bottle, permitting it to fall freely into chute 1. It will be seen that at each operation of the labeler two labels are applied and one bottle is released to fall into chute 1.

In Fig. 4 is illustrated a modification of our chute 101 designed to deliver bottles head first for packing in a partitioned carton. The chute is of similar form to chute 1, but is reversed as respects top-and-bottom orientation of the falling bottles. It comprises flat back plate 102, curved front plate 103, inclined top plate 106, and curved check plate 107 having checking portion 108 and damping portion 109. The bottles drop from chute 101 into carton 120, which may be moved automatically or manually to receive them in desired respective compartments.

A modified form of check plate is shown in Fig. 5, comprising a foundation 207 that need not be resilient, and two resilient rubber blocks 208 and 209 cemented or otherwise fastened to the foundation. Block 208 serves as the checking portion of the plate and block 209 as the damping portion. Foundation 207 may be made of metal, laminated plastic, vulcanized fiber or other suitable material. The curvature of the active faces of blocks 208 and 209 is cylindrical, the generating elements being perpendicular to the plane of the drawing.

Chute 1 has a top opening wide from front to back to receive the falling bottles in horizontal position and a narrow bottom opening to orient and aline the bottles as they leave the chute. The perpendicular horizontal dimension of the chute, however, is constant throughout its height.

Figures 6 and 7 illustrate additional modifications of our chute and their relation to horizontal bottles a' falling into them. In these chutes the checking means 307 consists of a rubber-covered rod or tube secured between the respective pairs of side plates 304—305 and 404—405 by screws 310 at each end of the rod. Back plate 303 (Fig. 6) is flat, while back plate 403 (Fig. 7) is bent as shown. In both cases front plates 302 and 402 are bent. These bends are necessary to provide a wide top opening to receive the falling bottles and a narrow bottom opening to orient the fallen bottles.

The operation of our chute 1 (Figs. 1, 2 and 3) is as follows:

Bottles are released in regular timed succession from the labeler, the tops being always directed to the front of the machine—i. e. to the left at a in Fig. 2. Each bottle falls freely from the labeler into the chute immediately below. As it falls the top is checked by striking checking portion 8 of check plate 7 so that it is momentarily arrested, while inertia carries the bottom of the bottle in an arc downward as at b. The bottle then swings to a nearly vertical position, its bottom striking plate 3 as at c, slides further against damping portion 9 of check plate 7 as at d, and finally lands upright on conveyor belt 12 in properly oriented position as at e. The resilience of check plate 7 and the damping effect on the fall of check plate 7 and back plate 3 prevent breakage. The conforming shape of the bottom of the chute constrains the bottles to land on belt 12 in uniformly oriented position, while the lower portions of plates 2 and 3 prevent the bottle from falling over as it lands on the belt. The movement of belt 12 in the direction of the arrows removes each bottle from the chute as soon as it lands, through the aperture left between plates 2 and 3 below the edge of plate 5 as shown in Figs. 2 and 3.

For 6 ounce modernistic bottles 6⅛ inches high, 2¾ inches wide and 1 5/16 inches thick, we have successfully used a trough made of 20 gage sheet iron and a check plate 2⅞ inches wide made of 2–20 gage spring steel. The total drop from the labeler to the belt was 15 inches. Side plates of the chute were parallel and spaced 3 inches apart, providing a bottle clearance of ¼ inch. The vertical bottom portion of the curved back plate was spaced 1¾ inches from the front plate, providing a clearance of 7/16 inch for the bottles as they were carried away.

Prior to the use of our chute the labeler was operated at a rate of 35 bottles per minute with an average reject rate of 10 percent. The use of our chute permitted operation at the same rate, with a reject rate of only 1 percent and with one less operator.

From the above it will be seen that we have invented an unusually simple, economical and effective chute for receiving, orienting and delivering freely falling bottles, and that our device operates without moving parts and without the use of twisted guide surfaces; in our preferred form of chute the curved surfaces are, in a broad sense, cylindrical and may be generated geometrically by a horizontal straight line moving parallel to its original position.

We claim:

1. A chute adapted to receive uniformly alined and oriented, horizontally presented, free-falling bottles and deliver them unbroken in a uniformly alined vertical position, said chute having side and front and back plates, the side plates being flat and one of the front and back plates having horizontal cylindrical curvature, and mounted within said chute in opposition to said curved plate a resilient check plate having cylindrical curvature and cooperating with said other curved plate to form a curved passage for descending bottles, the upper portion of said check plate having a resilient curved checking portion adapted to receive and check the descent of one end of each falling bottle, the lower portion of said check plate having a curved portion protruding slightly into said curved passage to damp the descent of each bottle.

2. In a bottle-handling machine having an operating station which periodically and automatically ejects bottles to fall freely in uniformly alined position with respect to their longitudinal axes and having below said operating station a conveyor belt which receives and advances said bottles: a bottle chute interposed in the trajectory of said bottles between said operating station and said conveyor belt, the chute having a sinuous bottle channel formed in part by a cylindrically curved wall of the chute and a resilient cylindrically curved check plate, the generating elements of both curved surfaces being substantially parallel, the upper portion of said check plate being positioned to receive and check one end of each bottle in its fall while permitting the other end to descend in an arc into the sinuous bottle passage, the lower end of said check plate projecting sufficiently into the bottle passage to damp but not prevent the descent of each bottle, the sinuous bottle passage terminating at its lower end in a straight vertical portion immediately above the conveyor belt, the straight portion of the passage having an opening on one side to permit egress of the bottles but having at least two other sides closed to steady the bottles as they land on the belt.

3. In a bottle-handling machine having an operating station which periodically ejects bottles to fall freely in uniformly alined and oriented horizontal position with respect to their longitudinal axes and having below said operating station a receiving station to receive said bottles: a bottle chute interposed in the trajectory of said bottles between said operating station and said receiving station adapted to receive the free-falling bottles and deliver them to the receiving station in a uniformly alined vertical position, said chute having a rectangular horizontal cross section defined by flat side plates and front and back plates, one of which has horizontal cylindrical curvature, and having resilient checking means fixedly mounted at its entrance to intercept and check one end of each free-falling bottle, one portion of the interior of said chute below said checking means being positioned to constitute a damping means to retard the descent of each bottle.

4. A combination as defined in claim 3 in which the receiving station comprises a conveyor belt and one side of the lower portion of the chute is cut away to permit lateral egress of each bottle in a vertical position.

5. A combination as defined in claim 3 in which the bottle passage comprises a lower straight portion and an upper sinuous portion, the latter being defined by the flat side plates, the curved plate and the checking means, the checking means being mounted in opposition to the curved plate and having horizontal cylindrical curvature.

ERNEST W. MAYNARD.
LOUIS P. DI GIACOMO.

REFERENCES CITED

The following references are of record in the file of this patent:

UNITED STATES PATENTS

| Number | Name | Date |
| --- | --- | --- |
| 1,133,436 | Gramling | Mar. 30, 1915 |
| 1,766,681 | Payne | June 24, 1930 |
| 2,350,425 | Spalding et al. | June 6, 1944 |
| 2,376,738 | Turner | May 22, 1945 |
| 2,404,480 | Fernold | July 23, 1946 |